United States Patent [19]

Vonk

[11] 4,270,708
[45] Jun. 2, 1981

[54] CABLE WINDER

[75] Inventor: Klaas Vonk, Hoogeveen, Netherlands

[73] Assignee: U.S. Philips Corporation, New York, N.Y.

[21] Appl. No.: 91,298

[22] Filed: Nov. 5, 1979

[30] Foreign Application Priority Data

Dec. 12, 1978 [NL] Netherlands ............... 7812061

[51] Int. Cl.³ .................................... B65H 75/48
[52] U.S. Cl. ........................ 242/107.3; 191/12.2 R; 242/107.6
[58] Field of Search .......... 242/107.3, 107.6, 107.7; 191/12.2 R, 12.4

[56] References Cited

U.S. PATENT DOCUMENTS

| 2,293,755 | 8/1942 | Joabson | 242/107.3 |
| 2,393,138 | 1/1946 | Borkoski | 242/107.6 |
| 2,474,899 | 7/1949 | Hutt | 242/107.6 X |
| 3,339,030 | 8/1967 | Nilsson | 242/107.3 X |

FOREIGN PATENT DOCUMENTS 1110014  6/1961  Fed. Rep. of Germany ........ 242/107.3

Primary Examiner—John M. Jillions
Attorney, Agent, or Firm—Thomas A. Briody; William J. Streeter; Rolf E. Schneider

[57] ABSTRACT

An automatic cable winder for use, for example, with a vacuum cleaner includes a device for latching the cable drum to prevent its rotation in a winding direction, and a braking device to ensure that the cable is wound smoothly and uniformly. The braking device comprises a brake housing, a disc journalled therein, brake blocks pivotally mounted on the disc for engagement with the brake housing, and a friction wheel coupled to the disc and drivable by the drum. The brake housing is rotatable about a pin disposed eccentrically relative to the disc. The brake housing is coupled to the latching mechanism whereby the friction wheel is driven by the drum when the latching mechanism is released.

1 Claim, 3 Drawing Figures

CABLE WINDER

This invention relates to a cable winder for winding an electric cable of, for example, an electrical appliance, which winder comprises a housing, a drum which is mounted for rotation relative to the housing and on which the cable can be wound, a spiral spring which is secured between the housing and the drum for automatically winding the cable on the drum, a latching device for latching the drum so as to prevent its rotation in a winding direction, and a braking device which comprises a disc on which centrifugal brake blocks are located, which after the drum has been unlatched brake the drum so as to ensure that the cable is wound smoothly and uniformly.

Such a cable winder is known from Austrian Pat. No. 325571.

Braking devices for cable winders of the above-indicated type serve to wind the cable smoothly and uniformly. This ensures that the plug at the end of the cable and the connection of the cable to the plug are not damaged when the plug is pulled against the housing after the cable has been taken up. This also avoids any damage that may be caused by the dragging of objects by the sweeping motion of the cable during winding. In the cable winder described in Austrian Pat. No. 325571 the disc of the braking device comprises a flange of the drum. The force with which the brake blocks are pressed against a cylindrical braking surface in the radial direction, i.e. the braking force, depends on the speed with which the drum takes up the cable. In practice it has been found that in the case of such construction where the brake blocks are situated on the flange of the drum, the speed of the drum is so low that comparatively large brake blocks are necessary in order to obtain a sufficient braking force.

It is the object of the present invention to provide a cable winder with a braking device, in which comparatively small brake blocks provide a sufficient braking force.

To this end the cable winder in accordance with the invention is characterized in that the disc is adapted to be driven by the drum via a speed-increasing mechanism. The disc on which the centrifugal brake blocks are located now rotates with a substantially higher speed than the drum, so that only comparatively small brake blocks are necessary.

A preferred embodiment is characterized in that the braking device comprises a brake housing, in which the disc is journalled, as well as a friction wheel, which is coupled to the disc and which is adapted to be driven by the drum.

Most automatic cable winders are so constructed that for unwinding the cable it suffices to pull the cable. In a cable winder having a braking device in accordance with the invention, it is advantageous to couple this braking device to the latching device, so that the braking device is not actuated when the cable is pulled.

To this end the cable winder in accordance with the invention is characterized in that the brake housing is rotatable about a pin which is disposed eccentrically relative to the disc and which is secured in the winder housing, and which brake housing is coupled to the latching device so as to drive the friction wheel when the drum is unlatched.

The invention will now be described in more detail with reference to the accompanying drawings in which.

Figure 1:
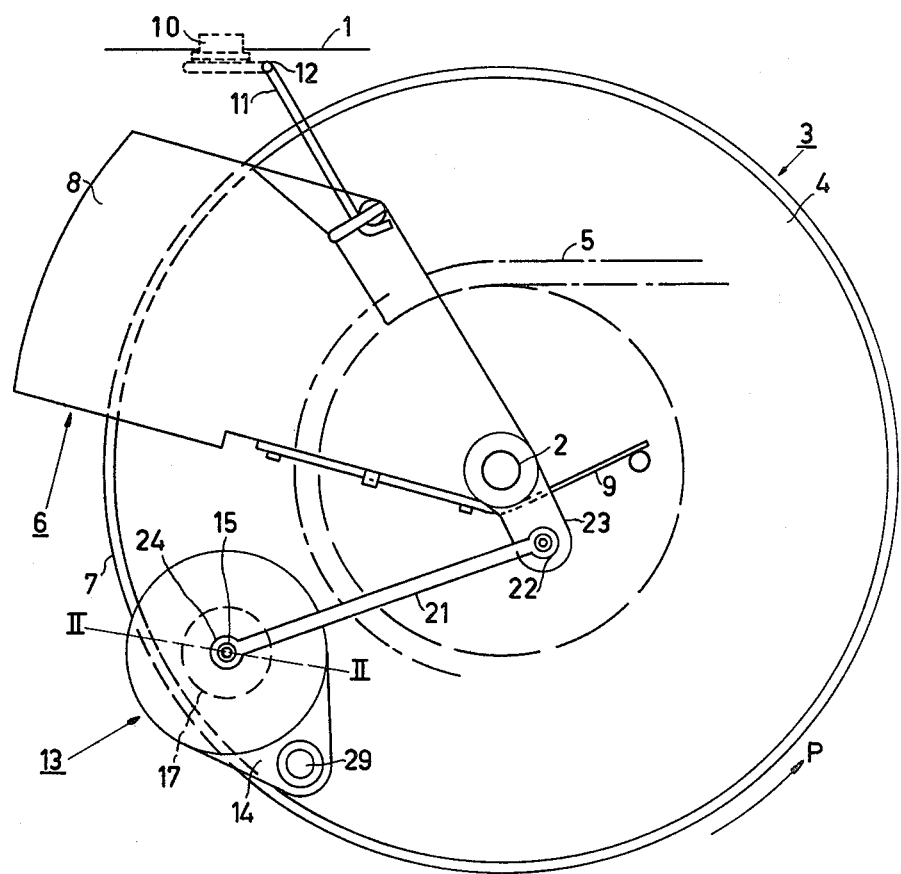
FIG. 1 shows the drum of a cable winder with a latching device and a braking device.

The cable winder shown in the drawings is adapted to be incorporated in a vacuum cleaner. In FIG. 1 reference numeral 1 designates the housing or casing of a vacuum cleaner. In the housing a spindle 2 is mounted on which a drum 3 is journalled. An electric cable 5 can be wound between two flanges 4 of the drum. A spiral spring, not shown, ensures that the cable is automatically wound onto the drum. In order to latch the drum 3 so as to prevent its rotation in a winding direction P, there is provided a latching device 6. The latching device or mechanism exerts a braking force on the axially disposed cylindrical rim 7 of one flange 4, which force is so great that the drum is latched. The latching device comprises a disc segment 8, which is rotatable about the drum spindle 2 and which is urged in the winding direction P by a leaf spring 9. In order to unlatch the drum, a push-button 10, which is located in a wall of the housing 1, is depressed, so that the disc segment is rotated in a direction opposite to the winding direction P via a lever 11, which is pivotal about a pivot 12. The operation of the latching device 6 is described in more detail in British Pat. No. 1,544,232.

Figure 2:
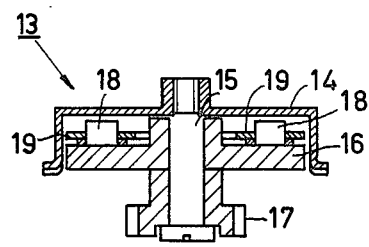
FIG. 2 is a cross-section on a slightly enlarged scale taken on the line II—II of FIG. 1.
Figure 3:
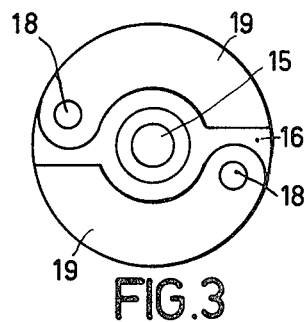
FIG. 3 is a plan view of a braking device of FIG. 2 with the brake housing removed.

Reference numeral 13 designates the braking device, which is located near the rim 7 of the one flange 4. The braking device comprises a brake housing 14, in which a spindle 15 is mounted. A disc 16 and a friction wheel 17, which is connected to the disc, are mounted for rotation about the spindle 15. On the disc 16 there are disposed two pins 18 about which semiannular brake blocks 19 are pivotal (see FIGS. 2 and 3). The brake housing 14 is rotatable about a pin 29, which is disposed eccentrically relative to the disc 16 and which is secured in the vacuum cleaner housing 1. The braking device 13 is coupled to the latching device by means of a rod 21. For this purpose one end 22 of the rod is pivotally coupled to a projection 23 of the disc segment 8 and the other end 24 is pivotally coupled to the brake housing 14.

The operation of the braking device is as follows: if a pulled-out cable is to be wound, the button 10 is depressed, so that the disc segment 8 is rotated in a direction opposite to the winding direction P. As a result of this the drum 3 is unlatched and the friction wheel 17 of the braking device 13 is made to engage with the inner side of the rim 7 of the drum. Under the influence of the spiral spring, not shown, the drum begins to rotate in the direction P and thus drives the disc 16 via the friction wheel 17. As the flange 4 of the drum has a greater diameter than the friction wheel 17, the friction wheel and thus the disc 16 will rotate with a high speed. The brake blocks 19 will be pivoted outwards by centrifugal force and pressed against the inner wall of the brake housing 14. The resulting friction brakes the drum in such a way that the drum takes up the cable smoothly and uniformly. As the disc 16 with the brake blocks 19 rotates at high speed the dimensions of the brake blocks and thus the dimensions of the braking device can be small, whilst the braking force is yet sufficient.

If a wound cable is to be pulled out, the push-button 10 need not be depressed, so that the braking device is not actuated when the cable is pulled.

For driving the braking device a pinion may be used instead of the friction wheel 17. The inner side of the rim 7 would then be provided with teeth.

What is claimed is:

1. A cable winder, which comprises a casing, a cable drum mounted in the casing for rotation relative thereto, a spiral spring secured between the casing and the drum for automatically winding the cable on the drum, mechanism for latching the drum to prevent its rotation in a winding direction, means to deactivate said latching mechanism, a brake housing, a disc journalled in said brake housing, brake blocks pivotally mounted on said disc for engagement with said brake housing, a friction wheel coupled to said disc and drivable by the drum, said brake housing being rotatable about a pin disposed eccentrically relative to the disc and mounted in the casing, and means coupling the brake housing to the latching mechanism whereby the friction wheel is driven by the drum when the latching mechanism is deactivated.

* * * * *